United States Patent
Cantatore

(10) Patent No.: US 8,690,718 B2
(45) Date of Patent: Apr. 8, 2014

(54) TIGHTENER FOR A BELT DRIVE OPERATING IN THE PRESENCE OF OIL

(75) Inventor: Michele Cantatore, Turin (IT)

(73) Assignee: Dayco Europe S.r.l. con Unico Socio (IT)

( * ) Notice: Subject to any disclaimer, the term of this patent is extended or adjusted under 35 U.S.C. 154(b) by 150 days.

(21) Appl. No.: 13/271,457

(22) Filed: Oct. 12, 2011

(65) Prior Publication Data

US 2012/0040789 A1    Feb. 16, 2012

Related U.S. Application Data

(62) Division of application No. 11/912,117, filed as application No. PCT/IT2005/000230 on Apr. 20, 2005, now abandoned.

(51) Int. Cl.
| | |
|---|---|
| *F16H 7/08* | (2006.01) |
| *F16H 7/10* | (2006.01) |
| *F16H 7/12* | (2006.01) |

(52) U.S. Cl.
USPC ........... 474/111; 474/101; 474/112; 474/133; 474/135

(58) Field of Classification Search
USPC ........... 474/111, 112, 109, 117, 101, 94, 110, 474/133, 135
See application file for complete search history.

(56) References Cited

U.S. PATENT DOCUMENTS

| | | | |
|---|---|---|---|
| 1,188,316 A | 6/1916 | Pierce | |
| 1,581,624 A * | 4/1926 | Wunderlich et al. | 474/87 |
| 2,054,023 A * | 9/1936 | McCann et al. | 474/139 |
| 2,196,255 A | 4/1940 | Dow | |
| 2,210,276 A * | 8/1940 | Bremer | 474/110 |
| 2,258,465 A | 10/1941 | Mullaney | |
| 2,575,313 A | 11/1951 | Covert et al. | |
| 2,789,438 A | 4/1957 | Hutchinson | |
| 3,216,267 A | 11/1965 | Dolza | |
| 3,811,332 A * | 5/1974 | Brown et al. | 474/111 |
| 3,838,606 A * | 10/1974 | Scalise | 474/111 |

(Continued)

FOREIGN PATENT DOCUMENTS

| | | |
|---|---|---|
| DE | 19623485 | 12/1996 |
| EP | 0879369 | 11/1998 |
| EP | 1273826 | 1/2003 |

OTHER PUBLICATIONS

International Search Report prepared by the European Patent Office dated Jul. 26, 2005 for PCT/IT2005/000230; Applicant, Dayco Europe S.r.l. con Unico Socio.

(Continued)

*Primary Examiner* — William A Rivera
*Assistant Examiner* — Henry Liu
(74) *Attorney, Agent, or Firm* — Sheridan Ross PC

(57) ABSTRACT

A tightener for a belt drive cooperates with the belt in the presence of oil, and has a pin with a first axis; a base plate integral with and substantially perpendicular to the pin; a cam arm connected in a rotary manner to the pin and movable with respect to the base plate; a contact member carried by the cam arm; and an elastic member connected to the cam arm to activate the contact member against the belt. The tightener also has a friction member made of oil-resistant material and axially supporting the cam arm on the base plate; and axial elastic means for loading the friction member against the base plate.

6 Claims, 4 Drawing Sheets

(56) References Cited

U.S. PATENT DOCUMENTS

| | | | |
|---|---|---|---|
| 4,081,066 A | 3/1978 | Ryba | |
| 4,395,250 A * | 7/1983 | King | 474/111 |
| 4,473,362 A | 9/1984 | Thomey et al. | |
| 4,504,252 A | 3/1985 | Honma | |
| 4,571,222 A | 2/1986 | Brandenstein et al. | |
| 4,596,538 A | 6/1986 | Henderson | |
| 4,605,387 A | 8/1986 | Okubo et al. | |
| 4,610,645 A | 9/1986 | Donn et al. | |
| 4,618,335 A | 10/1986 | Brandenstein et al. | |
| 4,634,407 A | 1/1987 | Holtz | |
| 4,689,037 A * | 8/1987 | Bytzek | 474/135 |
| 4,698,049 A | 10/1987 | Bytzek et al. | |
| 4,808,148 A | 2/1989 | Holtz | |
| 4,816,012 A | 3/1989 | Bytzek | |
| 4,822,654 A | 4/1989 | Takemura et al. | |
| 4,824,421 A | 4/1989 | Komorowski | |
| 4,832,665 A | 5/1989 | Kadota et al. | |
| 4,834,694 A | 5/1989 | Martin | |
| 4,904,230 A | 2/1990 | Kawashima et al. | |
| 4,906,222 A | 3/1990 | Henderson | |
| 4,917,655 A | 4/1990 | Martin | |
| 4,923,435 A | 5/1990 | Kadota et al. | |
| 4,934,987 A | 6/1990 | Kadota et al. | |
| 4,934,988 A | 6/1990 | Kawamura et al. | |
| 4,946,347 A | 8/1990 | Otto | |
| 4,988,548 A | 1/1991 | Takemura et al. | |
| 5,030,171 A | 7/1991 | Henderson | |
| 5,030,172 A | 7/1991 | Green et al. | |
| 5,033,423 A | 7/1991 | Diard | |
| 5,035,679 A | 7/1991 | Green et al. | |
| 5,078,656 A | 1/1992 | Brandenstein et al. | |
| 5,149,306 A * | 9/1992 | Sidwell et al. | 474/135 |
| 5,171,188 A | 12/1992 | Lardrot et al. | |
| 5,176,580 A | 1/1993 | Stamm et al. | |
| 5,186,689 A | 2/1993 | Yamamoto et al. | |
| 5,207,620 A | 5/1993 | Yamamoto et al. | |
| 5,244,438 A | 9/1993 | Golovatai-Schmidt | |
| 5,246,404 A * | 9/1993 | Ojima | 474/111 |
| 5,256,112 A | 10/1993 | Thomey et al. | |
| 5,266,067 A | 11/1993 | Gapco | |
| 5,328,415 A | 7/1994 | Furutani et al. | |
| 5,348,514 A | 9/1994 | Foley | |
| 5,370,586 A | 12/1994 | Thomsen et al. | |
| 5,391,119 A | 2/1995 | Kondo et al. | |
| 5,399,124 A | 3/1995 | Yamamoto et al. | |
| 5,453,057 A | 9/1995 | Gardner et al. | |
| 5,458,541 A | 10/1995 | Adler et al. | |
| 5,480,358 A | 1/1996 | Sakai et al. | |
| 5,503,599 A | 4/1996 | Brehler et al. | |
| 5,527,405 A | 6/1996 | Schleicher et al. | |
| 5,540,627 A | 7/1996 | Miyata | |
| 5,545,095 A * | 8/1996 | Henderson | 474/135 |
| 5,558,587 A | 9/1996 | Church | |
| 5,575,727 A | 11/1996 | Gardner et al. | |
| 5,599,245 A | 2/1997 | Giese | |
| 5,620,385 A | 4/1997 | Cascionale et al. | |
| 5,702,314 A | 12/1997 | Schmid | |
| 5,713,808 A | 2/1998 | Ohta | |
| 5,759,125 A | 6/1998 | Berg | |
| 5,833,563 A | 11/1998 | Takeda et al. | |
| 5,913,743 A * | 6/1999 | Ohta | 474/112 |
| 5,919,107 A | 7/1999 | Stepniak | |
| 5,993,340 A | 11/1999 | Rocca et al. | |
| 6,001,037 A | 12/1999 | Rocca et al. | |
| 6,102,820 A | 8/2000 | Imaharu et al. | |
| 6,138,804 A | 10/2000 | Tazumi et al. | |
| 6,149,542 A | 11/2000 | Lehtovaara | |
| 6,165,091 A | 12/2000 | Dinca et al. | |
| 6,196,940 B1 | 3/2001 | Lehtovaara | |
| 6,375,588 B1 | 4/2002 | Frankowski et al. | |
| 6,422,963 B2 | 7/2002 | Kurose | |
| 6,464,604 B1 | 10/2002 | Frankowski et al. | |
| 6,497,632 B2 | 12/2002 | Ayukawa et al. | |
| 6,575,860 B2 | 6/2003 | Dutil | |
| 6,932,731 B2 | 8/2005 | Kaiser et al. | |
| 7,140,992 B2 | 11/2006 | Dix et al. | |
| 7,273,432 B2 | 9/2007 | Schonmeier et al. | |
| 7,285,065 B2 | 10/2007 | Dinca et al. | |
| 7,588,507 B2 | 9/2009 | Ayukawa et al. | |
| 7,637,829 B2 | 12/2009 | Stone et al. | |
| 8,057,333 B2 * | 11/2011 | Haesloop | 474/111 |
| 2002/0144698 A1 | 10/2002 | Maiwald | |
| 2002/0160868 A1* | 10/2002 | Wigsten et al. | 474/101 |
| 2008/0287233 A1 | 11/2008 | Cantatore | |

OTHER PUBLICATIONS

International Preliminary Report on Patentability prepared by the European Patent Office dated Jul. 11, 2007 for PCT/IT2005/000230; Applicant, Dayco Europe S.r.l. con Unico Socio.

* cited by examiner

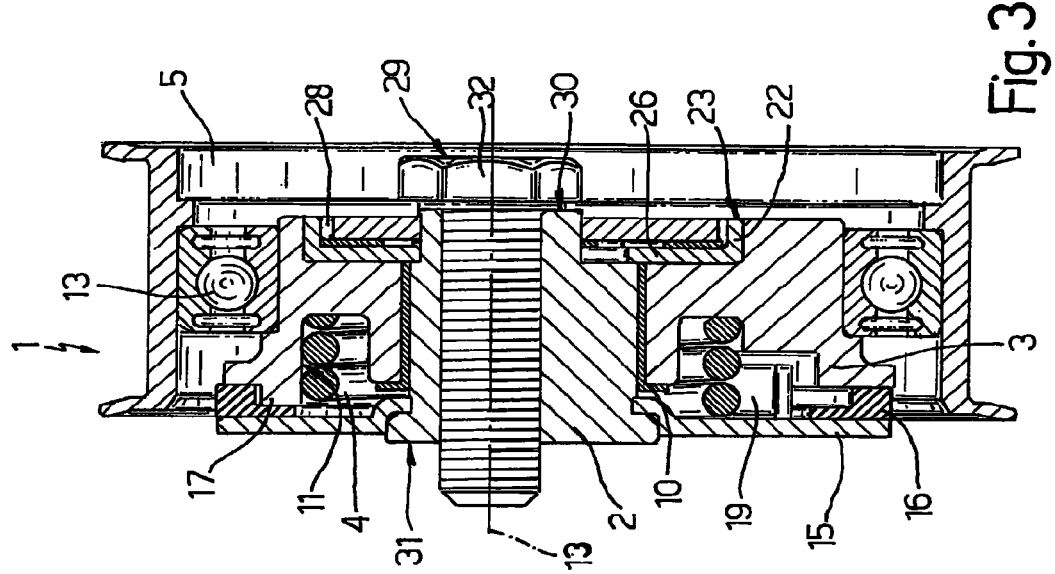
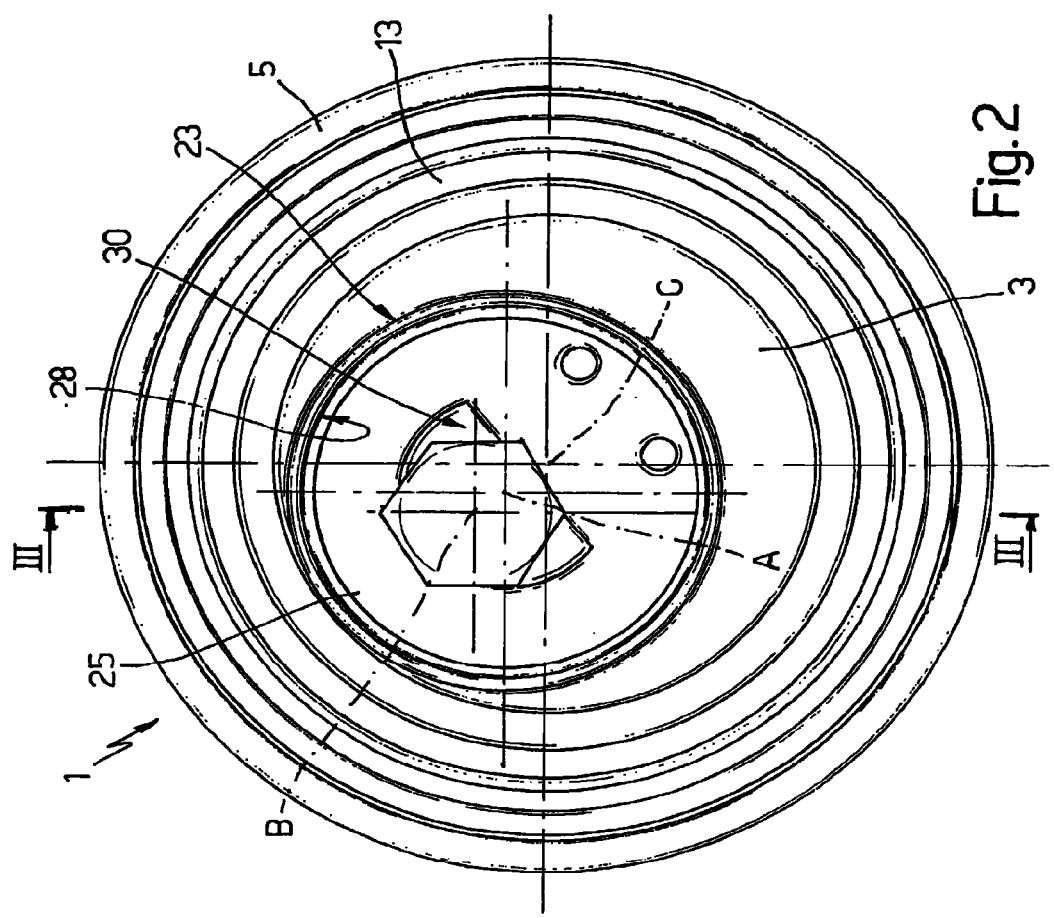

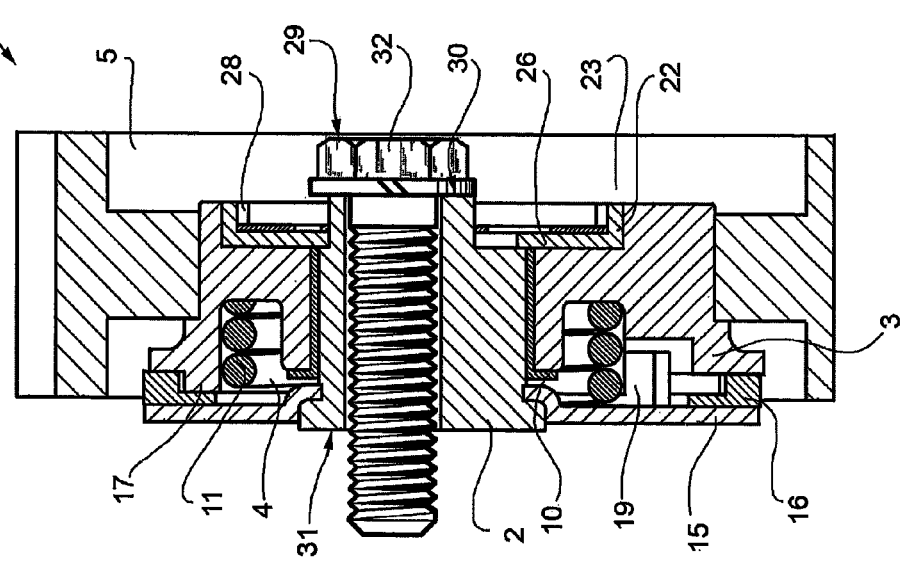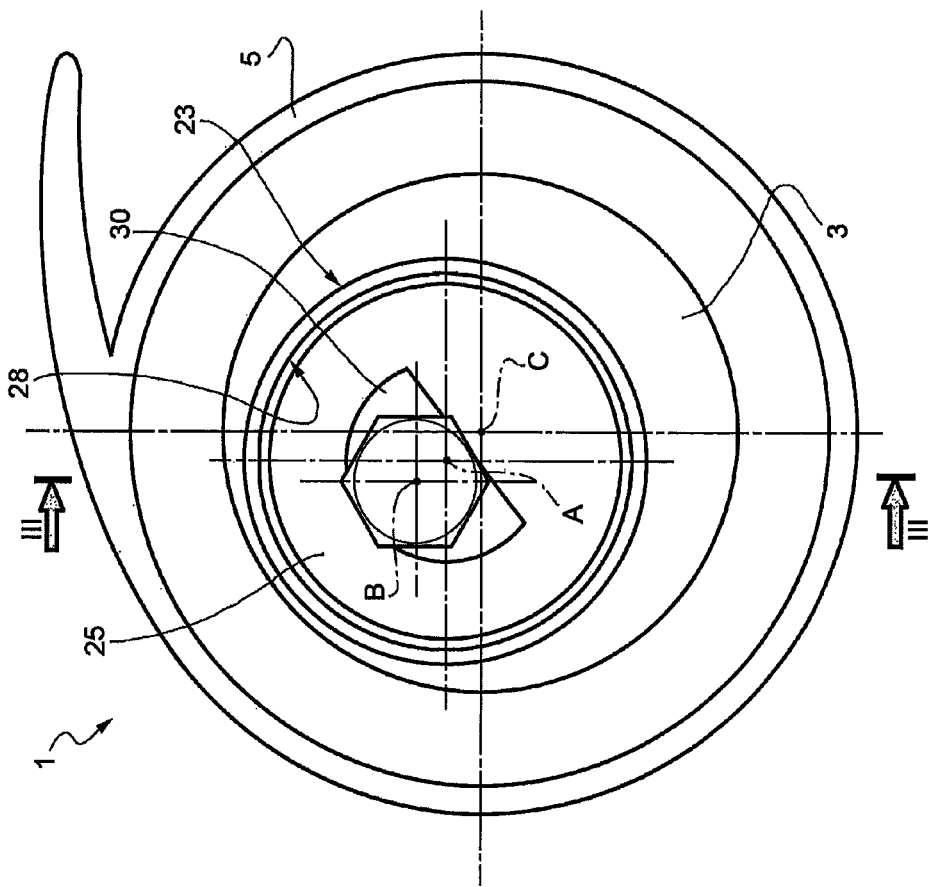

TIGHTENER FOR A BELT DRIVE OPERATING IN THE PRESENCE OF OIL

CROSS REFERENCE TO RELATED APPLICATION

This application is a divisional of U.S. patent application Ser. No. 11/912,117, filed on Jul. 3, 2008, now abandoned which is a national stage application under 35 U.S.C. 371 of PCT Application No. PCT/IT2005/000230 having an international filing date of Apr. 20, 2005, the entire disclosure of each of which is hereby incorporated herein by reference.

TECHNICAL FIELD

The present invention relates to a tightener for a belt drive operating in the presence of oil.

BACKGROUND ART

Known belt drives, such as for driving an internal combustion engine camshaft, are normally used in dry applications, in which a tightener is used to maintain correct tension of the belt.

Cam tighteners for dry applications are known comprising a fixed member with a supporting pin; a spring-loaded cam arm; an idle pulley fitted to the cam arm and cooperating with a timing belt; and a bushing of friction material interposed radially between the fixed pin and the cam arm to damp vibration of the belt.

For applications in the presence of oil, chains are normally used, which cooperate with a shoe to maintain correct tension.

Belt applications in the presence of oil have recently been developed, in which known tighteners have proved ineffective in maintaining correct tension.

DISCLOSURE OF INVENTION

It is an object of the present invention to provide a tightener for a belt drive operating in the presence of oil, designed to eliminate the aforementioned drawback.

BRIEF DESCRIPTION OF THE DRAWINGS

A preferred, non-limiting embodiment of the present invention will be described by way of example with reference to the accompanying drawings, in which:

FIG. 2 shows a front view of FIG. 1;

FIG. 3 shows a section along line III-III in FIG. 2.

FIG. 5 shows a front view of FIG. 4;

FIG. 6 shows a section along line III-III in FIG. 5.

BEST MODE FOR CARRYING OUT THE INVENTION

Figure 1:
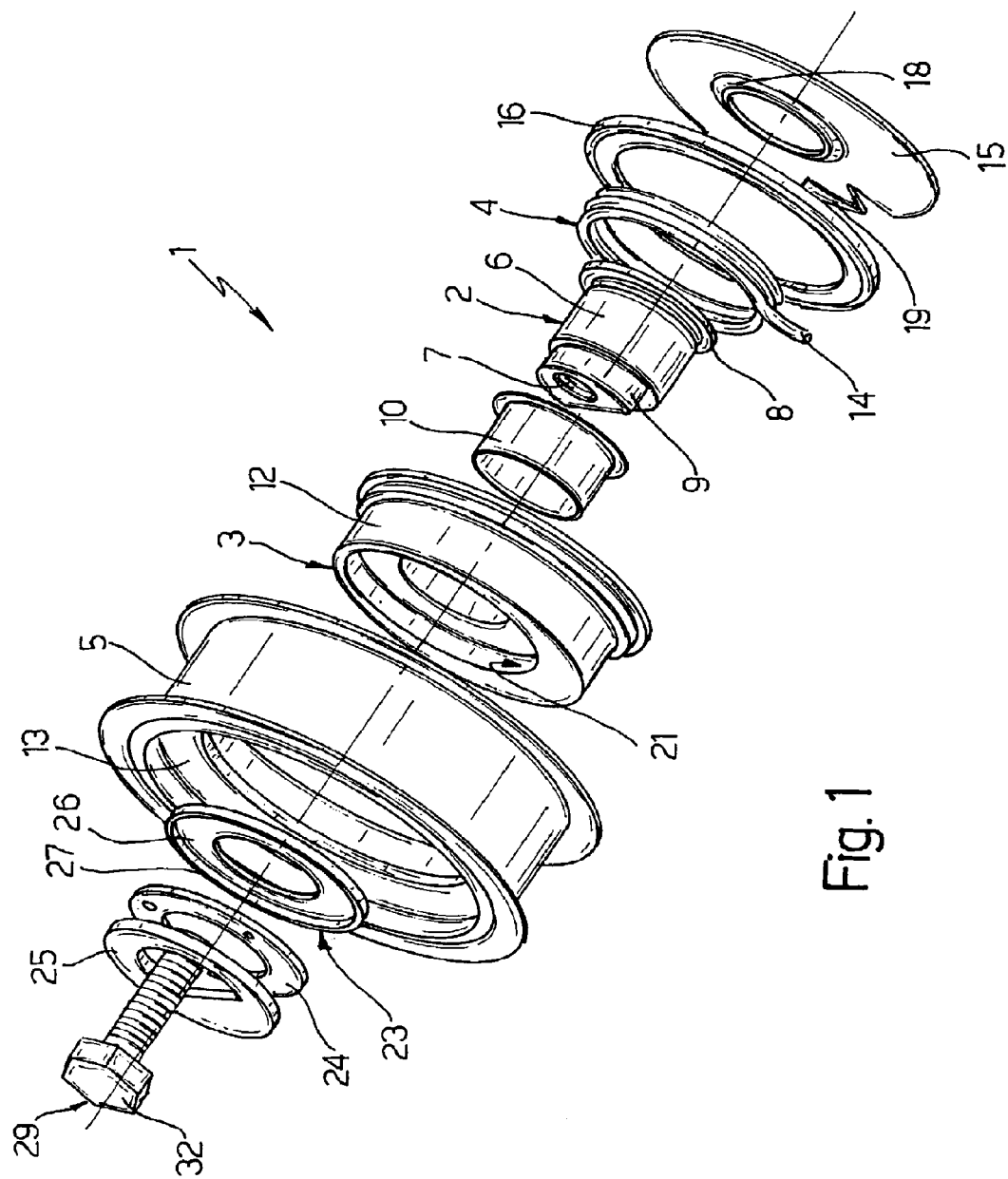
FIG. 1 shows an exploded view in perspective of a tightener in accordance with the present invention.

Number 1 in FIG. 1 indicates a tightener for a belt drive operating in the presence of oil, and comprising a fixed pin 2; a metal cam arm 3 mounted for rotation on fixed pin 2 and connected to a tensioning spring 4; and a hollow pulley 5 radially surrounding cam arm 3 and cooperating with and contacting a cog belt.

More specifically, fixed pin 2 has a cylindrical mounting surface 6 having an axis A; a through hole 7 having an axis B eccentric with respect to axis A; an end shoulder 8; and a contoured head 9 at the opposite end of cylindrical surface 6 to end shoulder 8. Through hole 7 extends through contoured head 9, which is symmetrical with respect to a plane through axes A and B.

Cam arm 3 fits radially onto mounting surface 6 by means of a bushing 10 made of antifriction material, e.g. teflon, and has an annular housing 11, and a cylindrical outer surface 12 having an axis C eccentric with respect to axes A and B. More specifically, cylindrical outer surface 12 supports hollow pulley 5 by means of a bearing 13, and housing 11 is open towards end shoulder 8, houses the whole of tensioning spring 4, and has a slot for connection to an end portion 14 of tensioning spring 4.

Cam arm 3 is supported axially by an annular base plate 15 connected perpendicularly to fixed pin 2, and by a friction ring 16 interposed between cam arm 3 and base plate 15 and made of material capable of maintaining friction even in the presence of oil, such as BERAL 1122 marketed by Federal-Mogul Friction Products Gmbh.

More specifically, the friction material used comprises an oil-resistant binder comprising caoutchouc; and a mixture of additives for obtaining friction in the presence of oil and comprising rock wool, magnesium oxide, graphite, and clay. The physical characteristics of the material used are: specific weight (measured at 20° C.) $2.04*10^-3$ kg/cm$^3$; thermal conductivity 1.00 W/m*° C.; approximate dry friction coefficient 0.47; and approximate oil-bath friction coefficient 0.10.

More specifically, cam arm 3 has an integral, radially peripheral collar 17 facing base plate 15 and defining a seat to make friction ring 16 radially integral with cam arm 3.

Base plate 15 comprises an inner edge 18 which rests axially on end shoulder 8; and a projection 19 projecting towards cam arm 3 and cooperating both with arm 3, to define two limit positions, and with an end portion (not shown) opposite end portion 14, to tension spring 4.

On the opposite side to base plate 15, cam arm 3 and contoured head 9 of fixed pin 2 define an annular seat 21 coaxial with axis A and for housing a supporting cup made of plastic, a Belleville washer 24, and a circular cover plate 25.

More specifically, cup 23 comprises, integrally, a flat portion 26 perpendicular to axis A; and a peripheral edge 27 parallel to axis A. Peripheral edge 27 houses Bellville washer 24 radially, and, together with cover plate 25, defines an annular gap 28 to allow oil in to lubricate Belleville washer 24 and mounting surface 6. Belleville washer 24 is pressed axially against flat portion 26 by cover plate 25. More specifically, cover plate 25 is connected angularly rigidly to contoured head 9 by a matching shape fit, and is fixed axially by caulking.

Tightener 1 is fitted to a wall of an internal combustion engine by means of a screw 29 housed inside through hole 7. More specifically, contoured head 9 is bounded by a supporting surface 30 projecting axially with respect to cover plate 25, and end shoulder 8 is bounded by a supporting surface 31 projecting axially with respect to base plate 15, so that, when tightener 1 is fixed to the engine, the head 32 of screw 29 cooperates with supporting surface 30, and supporting surface 31 directly contacts the wall of the engine to keep base plate 15 detached. The pull exerted by the screw is therefore transmitted to fixed pin 2, and the axial load of friction ring 16, which is much less than the pull exerted by the screw, is controlled accurately by sizing Belleville washer 24. Belleville washer 24, in fact, is used in the maximum-compression condition, in which it exerts substantially constant force alongside minor variations in the axial dimension of cam arm 3, caused, for example, by in-service wear of friction ring 16.

The advantages of the tightener according to the present invention are as follows.

Using an axially-loaded, oil-resistant friction ring 16 provides for achieving satisfactory damping in the presence of oil. Moreover, tightener 1 comprises numerous component parts in common with a dry-operating tightener, thus enabling mass production cost benefits. More specifically, by replacing friction ring 16 with a PTFE ring, tightener 1 may also be used dry.

Moreover, using an oil-resistant friction material, cost is further reduced by eliminating in-process cleaning of metal parts, i.e. fixed pin 2 and cam arm 3.

The fact that the whole of tensioning spring 4 is housed axially inside housing 11 of cam arm 3 provides for reducing length to adapt to applications featuring belts operating in the presence of oil, and which generally tend to replace chains which permit particularly short lengths.

Clearly, changes may be made to the tightener as described and illustrated herein without, however, departing from the scope pf the present invention as defined in the accompanying Claims.

For example, friction ring 16 may be housed inside a groove defined by cam arm 3, or may be glued.

Figure 4:
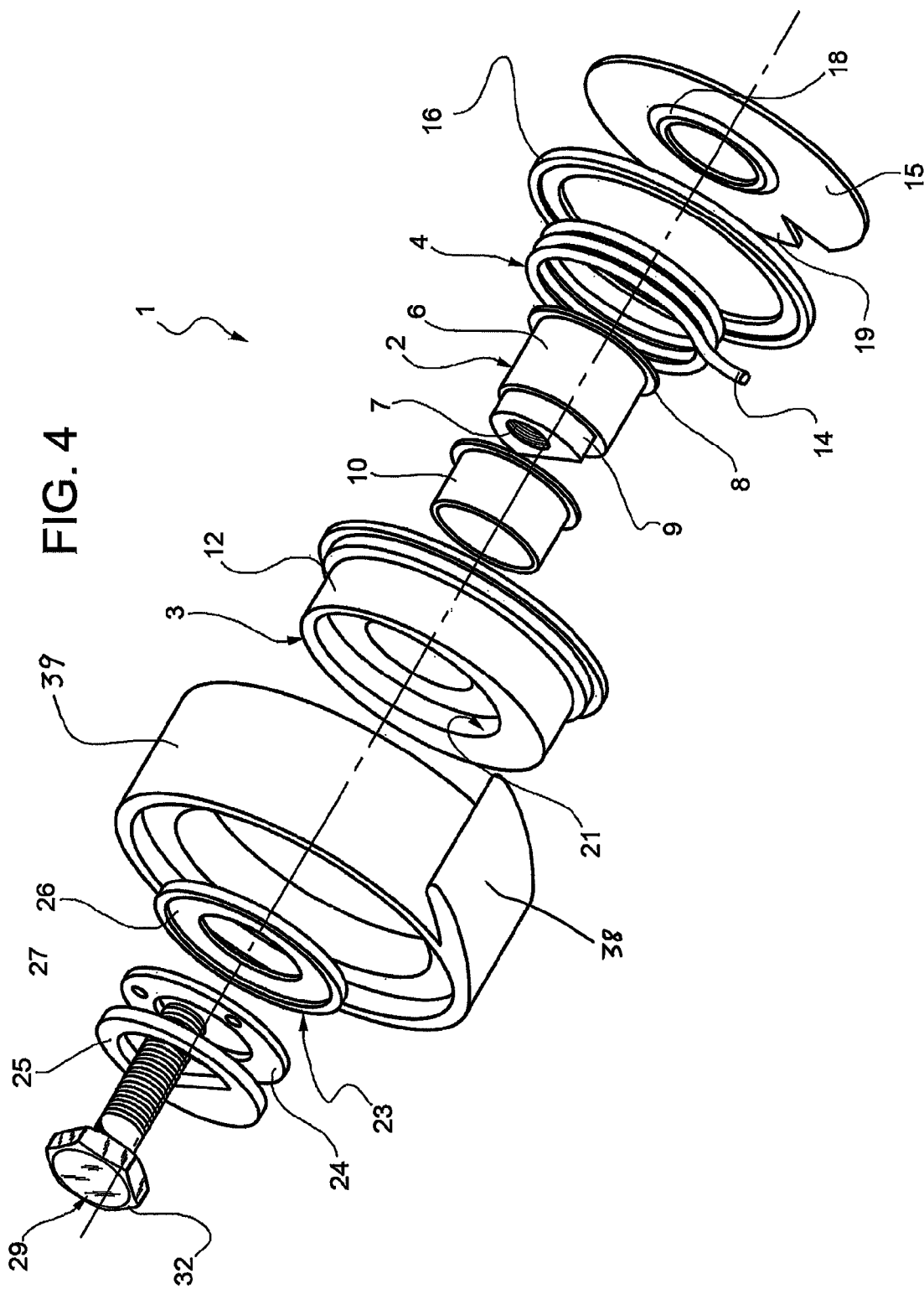
FIG. 4 shows an exploded view in the perspective of another embodiment of the tightener in accordance with the present invention.

Hollow pulley 5 and bearing 13 may be replaced by a shoe having a ring member fitted to cylindrical outer surface 12 and integral with cam arm 3. Referring to FIGS. 4-6, hollow pulley 5 and bearing 13 may be replaced by a shoe 38 having a ring member 39 fitted to cylindrical outer surface 12 and integral with cam arm 3. The ring member 39 is carried by said cam arm 3, rotates on the eccentric axis, and radially surrounds the cam arm 3. The shoe 38 protrudes radially away from an outer annular surface of said ring member 39.

To reduce the number of component parts of tightener 1, supporting cup 23 may be eliminated, and Belleville washer 24 may contact cam arm 3 directly, provided gap 28 is sized to allow sufficient oil through to lubricate the surfaces in relative motion.

The friction material used comprises a caoutchouc-based binder if a flexible friction ring 16 is required. If a rigid friction ring is required, caoutchouc is not used.

The invention claimed is:

1. A tightener for a belt drive for driving an internal combustion engine crankshaft, comprising: (i) a pin having a first axis; (ii) a base plate integral with said pin, (iii) a cam arm having an eccentric axis, wherein said cam arm is connected in a rotary manner to said pin and movable with respect to said base plate; (iv) a contact member carried by said cam arm and rotating on said eccentric axis, said contact member including a ring member radially surrounding said cam arm, and a shoe protruding radially away from an outer annular surface of said ring member; (v) an elastic member connected to said arm to activate said contact member against a belt; (vi) a friction member supporting said arm on said base plate; (vii) axial elastic means for loading said friction member against said base plate; and (viii) a securing member extending through said tightener including through said pin, wherein said friction member is made of an oil-resistant polymer material and interposed between said elastic member and said contact member.

2. A tightener, as claimed in claim 1, wherein the belt drive operates in the presence of an oil environment within the internal combustion engine.

3. A tightener, as claimed in claim 1, wherein the base plate is arranged to be substantially perpendicular to said pin.

4. A tightener, as claimed in claim 1, wherein the axial elastic means includes a washer.

5. A tightener, as claimed in claim 1, wherein the friction member is radially interposed between said elastic member and said contact member.

6. A tightener, as claimed in claim 1, wherein the friction member is enclosed within the cam arm or the contact member.

\* \* \* \* \*